United States Patent
Khawand et al.

(10) Patent No.: US 9,871,545 B2
(45) Date of Patent: Jan. 16, 2018

(54) SELECTIVE SPECIFIC ABSORPTION RATE ADJUSTMENT

(71) Applicant: Microsoft Technology Licensing, LLC, Redmond, WA (US)

(72) Inventors: Charbel Khawand, Sammamish, WA (US); Mark John Seilstad, Ellensburg, WA (US); Sharon Drasnin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/562,212

(22) Filed: Dec. 5, 2014

(65) Prior Publication Data
US 2016/0164563 A1 Jun. 9, 2016

(51) Int. Cl.
*H04W 52/00* (2009.01)
*H04B 1/3827* (2015.01)
(Continued)

(52) U.S. Cl.
CPC ........ *H04B 1/3838* (2013.01); *H04W 52/221* (2013.01); *H04W 52/283* (2013.01); *Y02B 60/50* (2013.01)

(58) Field of Classification Search
USPC .... 455/566, 550.1, 556.1, 575.7, 75, 77, 87, 455/552, 90.2; 343/702, 861
(Continued)

(56) References Cited

U.S. PATENT DOCUMENTS

| 4,016,490 A | 4/1977 | Weckenmann et al. |
| 4,729,129 A | 3/1988 | Koerner |

(Continued)

FOREIGN PATENT DOCUMENTS

| CN | 1123476 A | 5/1996 |
| CN | 1179864 A | 4/1998 |

(Continued)

OTHER PUBLICATIONS

"Digital, Silicon Microphone has 2.6 X 1.6mm2 Footprint", Published on: Dec. 12, 2005, Available at: http://news.thomasnet.com/fullstory/Digital-Silicon-Microphone-has-2-6-x-1-6-mm footprint-471386.
(Continued)

*Primary Examiner* — Ganiyu A Hanidu
(74) *Attorney, Agent, or Firm* — Holzer Patel Drennan

(57) ABSTRACT

An electronic device provides a capability of distinguishing between human tissue and a non-human object in proximity of a transmission source. In this manner, transmission power adjustments to the transmission source can be made selectively, depending on whether human tissue or a non-human object is detected in the proximity of the RF transmitter. Distinguishing between human tissue and other non-human-tissue objects in proximity of the transmission source provides for selective control of SAR adjustments. Accordingly, an electronic device can avoid certain communication performance reductions introduced by decreases in transmission power effected to comply with SAR standards by reducing transmission power when human tissue is detected in the proximity but not reducing transmission power when a non-human object (but no human tissue) is detected in the proximity.

20 Claims, 7 Drawing Sheets

(51) Int. Cl.
*H04W 52/22* (2009.01)
*H04W 52/28* (2009.01)

(58) Field of Classification Search
IPC .......... H04B 1/3838,7/15535; H04M 1/72569
See application file for complete search history.

(56) References Cited

U.S. PATENT DOCUMENTS

| | | |
|---|---|---|
| 4,806,944 A | 2/1989 | Jacomb-Hood |
| 5,166,679 A | 11/1992 | Vranish et al. |
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong, II |
| 6,657,595 B1 | 12/2003 | Phillips et al. |
| 6,989,745 B1 | 1/2006 | Milinusic et al. |
| 7,009,944 B1 | 3/2006 | Hulbert |
| 7,053,629 B2 | 5/2006 | Nevermann |
| 7,062,288 B2 | 6/2006 | Raaf et al. |
| 7,071,776 B2 | 7/2006 | Forrester et al. |
| 7,124,193 B1 | 10/2006 | Leung et al. |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2 | 6/2010 | Love et al. |
| 7,917,175 B2 | 3/2011 | Song et al. |
| 8,063,375 B2 | 11/2011 | Cobbinah et al. |
| 8,134,461 B2 | 3/2012 | Van Doorn |
| 8,208,423 B2 | 6/2012 | Liu et al. |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey |
| 8,432,322 B2 | 4/2013 | Amm et al. |
| 8,442,572 B2 | 5/2013 | Borran et al. |
| 8,466,839 B2 | 6/2013 | Schlub et al. |
| 8,483,632 B2 | 7/2013 | Arsani et al. |
| 8,515,496 B2 | 8/2013 | Cheng et al. |
| 8,520,586 B1 | 8/2013 | Husted et al. |
| 8,547,952 B2 | 10/2013 | Liu et al. |
| 8,548,388 B2 | 10/2013 | Chiu et al. |
| 8,559,999 B2 | 10/2013 | Hu et al. |
| 8,565,205 B2 | 10/2013 | Ho et al. |
| 8,577,289 B2 | 11/2013 | Schlub et al. |
| 8,723,531 B2 | 5/2014 | Harrison |
| 8,723,749 B2 | 5/2014 | Lin et al. |
| 8,775,103 B1 | 7/2014 | Jayaraj et al. |
| 8,781,437 B2 | 7/2014 | Ngai et al. |
| 8,792,930 B1 | 7/2014 | Gopalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,325,355 B2 | 4/2016 | Pecen et al. |
| 9,337,833 B2 | 5/2016 | Siska |
| 9,466,872 B2 | 10/2016 | Sanchez et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0064732 A1 | 4/2003 | McDowell et al. |
| 2003/0064761 A1 | 4/2003 | Nevermann |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0108957 A1 | 6/2004 | Umerhara et al. |
| 2004/0113847 A1 | 6/2004 | Qi et al. |
| 2004/0160378 A1 | 8/2004 | Abrams et al. |
| 2004/0222925 A1 | 11/2004 | Fabrega-Sanchez et al. |
| 2005/0017906 A1 | 1/2005 | Man et al. |
| 2005/0093624 A1 | 5/2005 | Forrester et al. |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa Cabral E Gil et al. |
| 2008/0051165 A1 | 2/2008 | Burgan et al. |
| 2008/0055160 A1 | 3/2008 | Kim et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doorn |
| 2009/0253459 A1 | 10/2009 | Naganuma et al. |
| 2009/0295648 A1 | 12/2009 | Dorsey et al. |
| 2009/0305742 A1* | 12/2009 | Caballero ............ H04B 1/3838 455/566 |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1 | 3/2010 | Liu et al. |
| 2010/0113111 A1 | 5/2010 | Wong et al. |
| 2010/0234058 A1 | 9/2010 | Hu et al. |
| 2010/0234081 A1 | 9/2010 | Wong et al. |
| 2010/0279751 A1 | 11/2010 | Pourseyed et al. |
| 2010/0283671 A1 | 11/2010 | Levin et al. |
| 2010/0283691 A1 | 11/2010 | Su et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Wilson et al. |
| 2012/0023225 A1 | 1/2012 | Imes et al. |
| 2012/0044115 A1 | 2/2012 | McCaughey et al. |
| 2012/0071195 A1 | 3/2012 | Chakraborty et al. |
| 2012/0074961 A1 | 3/2012 | Herrmann |
| 2012/0077538 A1 | 3/2012 | Yun |
| 2012/0133561 A1 | 5/2012 | Konanur et al. |
| 2012/0147801 A1 | 6/2012 | Ho et al. |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0214422 A1 | 8/2012 | Shi et al. |
| 2012/0223865 A1 | 9/2012 | Li et al. |
| 2012/0231784 A1 | 9/2012 | Kazmi |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0315847 A1 | 12/2012 | Li et al. |
| 2012/0329517 A1 | 12/2012 | Elin |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |

(56) References Cited

U.S. PATENT DOCUMENTS

| | | | |
|---|---|---|---|
| 2013/0137487 A1 | 5/2013 | Sato | |
| 2013/0149957 A1* | 6/2013 | Desclos | H04B 7/15535 455/11.1 |
| 2013/0157564 A1 | 6/2013 | Curtis et al. | |
| 2013/0169348 A1 | 7/2013 | Shi | |
| 2013/0178174 A1 | 7/2013 | Geris et al. | |
| 2013/0179167 A1 | 7/2013 | Edgington et al. | |
| 2013/0203363 A1* | 8/2013 | Gratt | A61N 1/08 455/73 |
| 2013/0210477 A1 | 8/2013 | Peter | |
| 2013/0217342 A1* | 8/2013 | Abdul-Gaffoor | H03K 17/955 455/77 |
| 2013/0241670 A1 | 9/2013 | Mikhemar et al. | |
| 2013/0278474 A1 | 10/2013 | Lenormand et al. | |
| 2013/0210106 A1 | 11/2013 | Wang et al. | |
| 2013/0293244 A1 | 11/2013 | Leek | |
| 2013/0300618 A1 | 11/2013 | Yarga et al. | |
| 2013/0310105 A1 | 11/2013 | Sagae et al. | |
| 2013/0314365 A1 | 11/2013 | Woolley et al. | |
| 2013/0335291 A1 | 12/2013 | Judson et al. | |
| 2014/0015595 A1 | 1/2014 | Van Ausdall et al. | |
| 2014/0021801 A1 | 1/2014 | Kao et al. | |
| 2014/0066124 A1* | 3/2014 | Novet | H04M 1/72569 455/556.1 |
| 2014/0071008 A1 | 3/2014 | Desclos et al. | |
| 2014/0078094 A1 | 3/2014 | Yang | |
| 2014/0087663 A1 | 3/2014 | Burchill et al. | |
| 2014/0098491 A1 | 4/2014 | Wang | |
| 2014/0098693 A1 | 4/2014 | Tabet et al. | |
| 2014/0128032 A1* | 5/2014 | Muthukumar | H04M 1/72569 455/411 |
| 2014/0139380 A1 | 5/2014 | Ouyang et al. | |
| 2014/0141733 A1 | 5/2014 | Wong et al. | |
| 2014/0152121 A1 | 6/2014 | Ku | |
| 2014/0155000 A1 | 6/2014 | Erkens | |
| 2014/0159980 A1 | 6/2014 | Finegold | |
| 2014/0173269 A1 | 6/2014 | Varoglu et al. | |
| 2014/0176938 A1 | 6/2014 | Yang et al. | |
| 2014/0177371 A1 | 6/2014 | Ellis et al. | |
| 2014/0206297 A1 | 7/2014 | Schlub et al. | |
| 2014/0274188 A1 | 9/2014 | Thorson | |
| 2014/0274189 A1 | 9/2014 | Moller et al. | |
| 2014/0280450 A1 | 9/2014 | Luna | |
| 2014/0292587 A1 | 10/2014 | Yarga et al. | |
| 2014/0307570 A1 | 10/2014 | Hong | |
| 2014/0315592 A1* | 10/2014 | Schlub | H04B 1/3838 455/522 |
| 2014/0357207 A1 | 12/2014 | Ma | |
| 2014/0357313 A1 | 12/2014 | Mercer et al. | |
| 2014/0370929 A1 | 12/2014 | Khawand | |
| 2015/0031408 A1 | 1/2015 | Kalla et al. | |
| 2015/0053575 A1 | 2/2015 | Bridges et al. | |
| 2015/0141080 A1 | 5/2015 | Standing | |
| 2015/0169093 A1 | 6/2015 | Nakao | |
| 2015/0177371 A1 | 6/2015 | Abbasi et al. | |
| 2015/0199042 A1 | 7/2015 | Standing et al. | |
| 2015/0200444 A1 | 7/2015 | Mercer et al. | |
| 2015/0201385 A1 | 7/2015 | Mercer et al. | |
| 2015/0201387 A1 | 7/2015 | Khawand et al. | |
| 2015/0288074 A1 | 10/2015 | Harper et al. | |
| 2015/0382307 A1 | 12/2015 | Harper et al. | |
| 2016/0049978 A1 | 2/2016 | Mercer et al. | |
| 2016/0098053 A1 | 4/2016 | Khawand et al. | |
| 2016/0064801 A1 | 7/2016 | Lee et al. | |
| 2016/0204836 A1 | 7/2016 | Lee et al. | |

FOREIGN PATENT DOCUMENTS

| | | |
|---|---|---|
| CN | 100504407 C | 9/2006 |
| CN | 102064812 A | 5/2011 |
| CN | 102077234 A | 5/2011 |
| CN | 202276339 U | 6/2012 |
| CN | 102714346 A | 10/2012 |
| CN | 102835036 A | 12/2012 |
| CN | 103248747 A | 8/2013 |
| EP | 343421 | 5/1998 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 A1 | 11/2011 |
| EP | 2405534 A1 | 1/2012 |
| EP | 2410661 | 1/2012 |
| EP | 2509229 A1 | 10/2012 |
| EP | 2568605 A1 | 3/2013 |
| EP | 2787780 A1 | 10/2014 |
| GB | 2380359 | 4/2003 |
| GB | 2409345 A | 6/2005 |
| JP | 2002043957 A | 2/2002 |
| JP | 2007194995 A | 8/2007 |
| WO | 0042797 | 7/2000 |
| WO | 0148858 A3 | 7/2001 |
| WO | 2004015813 A1 | 2/2004 |
| WO | 2004091046 A1 | 10/2004 |
| WO | 2005018046 A1 | 2/2005 |
| WO | 2007043150 A1 | 4/2007 |
| WO | 2009149023 A1 | 12/2009 |
| WO | 2011051554 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 A1 | 7/2013 |
| WO | 2013141791 A1 | 9/2013 |
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

Khawand, et al., "Radiating Structure with Integrated Proximity Sensing" formerly titled as "SAR Sensor Execution where Part of One or More Antennas is on the Exterior Surface of a Mobile Device", unfiled US Patent Application.

Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.

Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.

U.S. Appl. No. 13/918,846, Pai, et al., "Radio Frequency (RF) Power Back-Off Optimization for Specific Absorption Rate (SAR) Compliance", filed Jun. 14, 2013.

"Low SAR Solution for Tablet PC", Published on: Sep. 27, 2011, Available at: http://www.auden.com.tw/TRC/webspace/disk/AudenSARSolutiondatasheet_110927.pdf.

"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.

Toit, Riaan Du, "Using Proximity Sensing to Meet Mobile Device FCC SAR Reulations", Published on: Apr. 17, 2012, Available at: http://www.eetimes.com/General/PrintView/431201.

(56) References Cited

OTHER PUBLICATIONS

Khawand, et al., "Radio Frequency (RF) Power Back-Off Optimization for Specific Abdorption Rate (SAR) Compliance", U.S. Appl. No. 13/918,846, filed Jun. 14, 2013, 40 pages.
Mercer, et al., "Specific Absorption Rate Mitigation", U.S Appl. No. 13/905,088, filed May 19, 2013, 53 pages.
International Searching Authority, United States Patent and Trademark Office, International Search Report and Written Opinion for Application No. PCT/US2014/042023, Aug. 29, 2014, 11 Pages.
International Searching Authority, United States Patent and Trademark Office, International Search Report and Written Opinion for Application No. PCT/US2014/039479, Sep. 19, 2014, 11 Pages.
International Searching Authority, United States Patent and Trademark Office, International Search Report and Written Opinion for Application No. PCT/US2014/072411, Mar. 27, 2015, 10 Pages.
International Searching Authority, United States Patent and Trademark Office, International Search Report and Written Opinion for Application No. PCT/US2014/072412, Mar. 30, 2015, 11 Pages.
International Searching Authority, United States Patent and Trademark Office, International Search Report and Written Opinion for Application No. PCT/US2014/072414, Apr. 14, 2015, 9 Pages.
"Non-Final Office Action", U.S Appl. No. 13/905,088, Mar. 23, 2015, 37 pages.
"Non-Final Office Action", U.S Appl. No. 14/152,351, Feb. 20, 2015, 9 pages.
"Second Written Opinion", of the International Preliminary Examining Authority, Application No. PCT/US2014/042023, Mar. 2, 2015, 6 Pages.
Virazovac, "Reaching the Next Level of Indoor Human Presence Detection: An RF Based Solution", 11th International Conference on Telecommunications in Modem Satellite, Cable and Broadcasting Services, Oct. 16, 2013, 4 pages.
International Searching Authority, U.S Patent and Trademark Office, International Search Report for PCT/US2014/072411, dated Mar. 27, 2015, 4 pages.
International Searching Authority, U.S Patent and Trademark Office, Written Opinion for PCT/US2014/072411, mailed Mar. 27, 2015, 6 pages.
I.B. Bonev et al, "Parmetric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
J. Poutanen, "Interaction Between Mobile Terminal Antenna and User" Helsinki University of Technology Master's Thesis, Oct. 9, 2007, 100 pages.
Sterner, et al., "Development of an Antenna Sensor for Occupant Detection in Passenger Transportation", In Proceedings of Procedia Engineering, vol. 47, Sep. 9, 2012, 6 pages.
Poutanent, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Curto, et al., "Circular Loop Antenna Operating at 434 MHz for Medical Applications: Loop-Tissue Interaction", In Proceeding of: Irish Signals and Systems Conference, Jul. 2006, 6 pages.
International Searching Authority, U.S Patent and Trademark Office, Updated Search Report for PCT/US2014/072412, dated Aug. 5, 2015, 3 pages.
International Searching Authority, U.S Patent and Trademark Office, Updated Written Opinion for PCT/US2014/072412, dated Oct. 5, 2015, 8 pages.
International Searching Authority, U.S. Patent and Trademark Office, Search Report and Written Opinion or PCT/US2014/072413, dated Jul. 16, 2015, 16 pages.
"SAR Evaluation Considerations for Laptop, Notebook, Netbook and Tablet Computers," Federal Communications Commission Office of Engineering and Technology Laboratory Division, May 28, 2013, 14 pages.
Hochwald, et al "Minimizing Exposure to Electromagnetic Radiation in Portable Devices", In Proceedings of Information Theory and Applications Workshop, Feb. 5, 2012, pp. 107.
International Searching Authority, United States Patent and Trademark Office, International Preliminary Report on Patentability, Application No. PCT/US2014/039479, dated Jun. 15, 2015, 27 pages.
International Searching Authority, United States Patent and Trademark Office, Second International Search Report and Written Opinion for PCT/US2014/072412; mailing date: Oct. 5, 2015, 11 pages.
International Searching Authority, United States Patent and Trademark Office, Search Report and Written opinion for PCT/US2014/065856, dated Feb. 4, 2015, 10 pages.
International Searching Authority, United States Patent and Trademark Office, Second Written Opinion of IPEA for PCT/US2014/065856, mailed Oct. 13, 2015, 6 pages.
International Searching Authority, U.S Patent and Trademark Office, International Search Report and Written Opinion for PCT/US2015/037563, dated Aug. 20, 2015, mailed Aug. 31, 2015, 11 pages.
International Searching Authority, U.S Patent and Trademark Office, Written Opinion of International Preliminary Examining Authority for PCT/US2014/072412, mailed Dec. 4, 2015, 5 pages.
International Searching Authority, U.S Patent and Trademark Office, Written Opinion of the International Preliminary Examining Authority for PCT/US2014/072413 mailed Dec. 17, 2015, 6 pages.
International Seraching Authority, U.S Patent and Trademark Office, International Search Report and Written Opinion for PCT/US2015/062851, dated Jan. 28, 2016, mailed Feb. 5, 2016, 11 pages.
International Preliminary Examining Authority, Second Written Opinion of the International Preliminary Examining Authority for PCT/2014/065856, mailed Oct. 13, 2015, 6 pages.
International Preliminary Examining Authority, International Preliminary Report on Patentability for PCT/US2014/065856, date mailed: Feb. 10, 2016, 8 pages.
International Searching Authority, U.S Patent and Trademark Office, International Search Report and Written Opinion for PCT/US2014/072413 mailed Jul. 16, 2015, 16 pages.
"Non-Final Office Action", U.S Appl. No. 14/152,652, filed Apr. 18, 2016 9 pages.
"Final Office Action Issued in U.S Appl. No. 14/927,287", Mailed Date: May 11, 2016, 34 Pages.
"Final Office Action", U.S Appl. No. 14/086,866, May 19, 2016, 7 pages.
International Searching Authority, U.S. Patent and Trademark Office, International Search Report and Written Opinion for PCT/US2015/052769, dated mailed: Feb. 17, 2016, 27 pages.
International Preliminary Examining Authority, International Preliminary Report on Patentability for PCT/US2014/072411; date mailed Mar. 23, 2016, 8 pages.
International Preliminary Report of Patentability issued in PCT Application No. PCT/US2014/072412; mailed date: Mar. 22, 2016, 7 pages.
International Preliminary Examining Authority, International Preliminary Report on Patentability for PCT/US2014/072413; date mailed Mar. 24, 2016, 7 pages.
Second Written Opinion Issued in PCT Application No. PCT/US2015/052769, Mailed Date: Jul. 7, 2016, 5 Pages.
Myllymaki, "Capacitive Antenna Sensor for User Proximity Recognition"; Academic dissertation to be presented with the assent of the Doctoral Training Committee of Technology and Natural Sciences of the University of Oulu for public defence in Arina-sali (Auditorium TA105), Linnanmaa, dated Nov. 30, 2012, 59 pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384,7 pages.
Mercer, et al., "Dynamic Antenna Power Control for Multi-Context Device", U.S. Appl. No. 14/987,964, filed Jan. 5, 2016, 52 pages.
"Non-Final Office Action", U.S Appl. No. 14/152,652, Jan. 5, 2016, 29 pages.

(56) References Cited

OTHER PUBLICATIONS

"Non-Final Office Action", U.S Appl. No. 14/152,086, Jul. 22, 2015, 13 pages.
"Non-Final Office Action", U.S Appl. No. 14/152,529, Sep. 22, 2015, 18 pages.
"Non-Final Office Action", U.S Appl. No. 13/918,846, Sep. 23, 2015, 16 pages.
"Non-Final Office Action", U.S Appl. No. 14/152,086, Nov. 30, 2015, 19 pages.
"Non-Final Office Action", U.S Appl. No. 14/927,287, Dec. 21, 2015, 28 pages.
"Non-Final Office Action", U.S Appl. No. 14/152,652, Dec. 23, 2015, 9 pages.
"Non-Final Office Action", U.S Appl. No. 14/320,320, Jan. 21, 2016, 9 pages.
"Non-Final Office Action", U.S Appl. No. 14/152,529, Jan. 22, 2016, 18 pages.
Office Action Issued In United Kingdom Patent Application No. 1219096.3, Mailed Date: Jan. 28, 2016, 4 Pages.
"Final Office Action", U.S Appl. No. 13/918,846, Mar. 2, 2016, 20 pages.
Office Action Issued in Chinese Patent Application No. 201380055749.X, Mailed Date: Jun. 6, 2016, 12 Pages.
"Non-Final Office Action", U.S. Appl. No. 13/918,846, Jun. 14, 2016, 21 pages..
"Non-Final Office Action", U.S Appl. No. 14/506,478, Jul. 1, 2016, 10 pages.
International Searching Authority, United States Patent and Trademark Office, International Search Report and Written Opinion for Application No. PCT/US2013/066441, Mailed Date: Dec. 12, 2013, 12 Pages.
International Preliminary Examining Authority, United States Patent and Trademark Office, International Preliminary Report on Patentability, Application No. PCT/US2013/066441, dated May 7, 2015, 9 pages.
International Searching Authority, U.S Patent and Trademark Office, Second Written Opinion of the International Preliminary Examining Authority for PCT/US2014/072414 mailed Dec. 9, 2015, 29 pages.
International Preliminary Examining Authority, International Preliminary Report on Patentability for PCT/US2014/072414; date mailed Mar. 23, 2016, 7 pages.
"Final Office Action", U.S. Appl. No. 14/320,320, Jul. 29, 2016, 10 pages.
Second Written Opinion Issued in PCT Application No. PCT/US2014/072411, dated Nov. 26, 2015, 7 pages.
"Non-Final Office Action", U.S. Appl. No. 14/086,866, dated Oct. 17, 2016, 7 pages.
"Final Office Action", U.S. Appl. No. 13/918,846, 10/26/16, 25 pages.
Office Action Issued in Columbian Patent Application No. NC2016/0000122, dated Aug. 19, 2016, 2 pages.
Office Action and Search Report Issued in Chinese Patent Application No. 201480031132.9, dated Nov. 2, 2016, 10 pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 20, 2016, 16 pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN6 39.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications", In Proceedings of 10th European Conference on Antennas and Propagation, Apr. 2016, 4 pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages.
Harper, "Loop Antenna With Integrated Proximity Sensing", U.S. Appl. No. 15/412,997, filed Jan. 23, 2016, 32 pages.
"Non-Final Office Action", U.S. Appl. No. 14/987,964, dated Nov. 30, 2016, 8 pages.
Office Action and Search Report Issued in Chinese Patent Application No. 201480033869.4, dated Dec. 19, 2016, 7 pages.
"Second Office Action Issued in Chinese Patent Application No. 201380055749.X", dated Jan. 25, 2017, 10 pages.
"Second Written Opinion Issued in PCT Application No. PCT/US2015/062851", dated Oct. 28, 2016, 8 pages.
International Preliminary Examining Authority, International Preliminary Report on Patentability for PCT/US2015/062851, dated Feb. 22, 2017, 19 pages.
Office Action and Search Report Issued in Chinese Patent Application No. 201480063903.02, dated Apr. 19, 2017, 11 pages.
International Searching Authority, U.S. Patent and Trademark Office, International Search Report and Written Opinion for PCT/US2016/069056, dated Mar. 31, 2017, 17 pages.
"Office Action Issued in Chinese Patent Application No. 201380055749.X", dated Jun. 12, 2017, 8 pages.
Second Office Action and Search Report Issued in Chinese Patent Application No. 201480031132.9, dated Jul. 26, 2017, 12 pages.

\* cited by examiner

SELECTIVE SPECIFIC ABSORPTION RATE ADJUSTMENT

BRIEF DESCRIPTIONS OF THE DRAWINGS

DETAILED DESCRIPTIONS

Modern electronic devices typically employ high frequency radio communications, particularly mobile devices. Because human tissue can be negatively impacted (e.g., heated) by strong radio waves when the human tissue is positioned close to a transmitting antenna, various governmental agencies and industry bodies have established standards to limit the radiofrequency (RF) power that is transmitted into human tissue. For example, a Specific Absorption Rate (SAR) test measures the RF power emitted into human tissue that is located near an RF transmitter. One approach for satisfying such SAR standards involves reducing the RF transmission power when an object (e.g., a human body part) is detected in close proximity to the RF transmitter. However, reducing RF transmission power can also impair communications performance of the electronic device.

The described technology provides a system having a capability of distinguishing between human tissue and a non-human object in proximity of a transmission source. In this manner, transmission power adjustments to the transmission source can be made selectively, depending on whether human tissue or a non-human object is detected in the proximity of the RF transmitter. Distinguishing between human tissue and other non-human-tissue objects in proximity of the transmission source provides for selective control of SAR adjustments. Accordingly, an electronic device can avoid certain communication performance reductions introduced by decreases in transmission power effected to comply with SAR standards by reducing transmission power when human tissue is detected in the proximity but not reducing transmission power when a non-human object (but no human tissue) is detected in the proximity.

Figure 1:
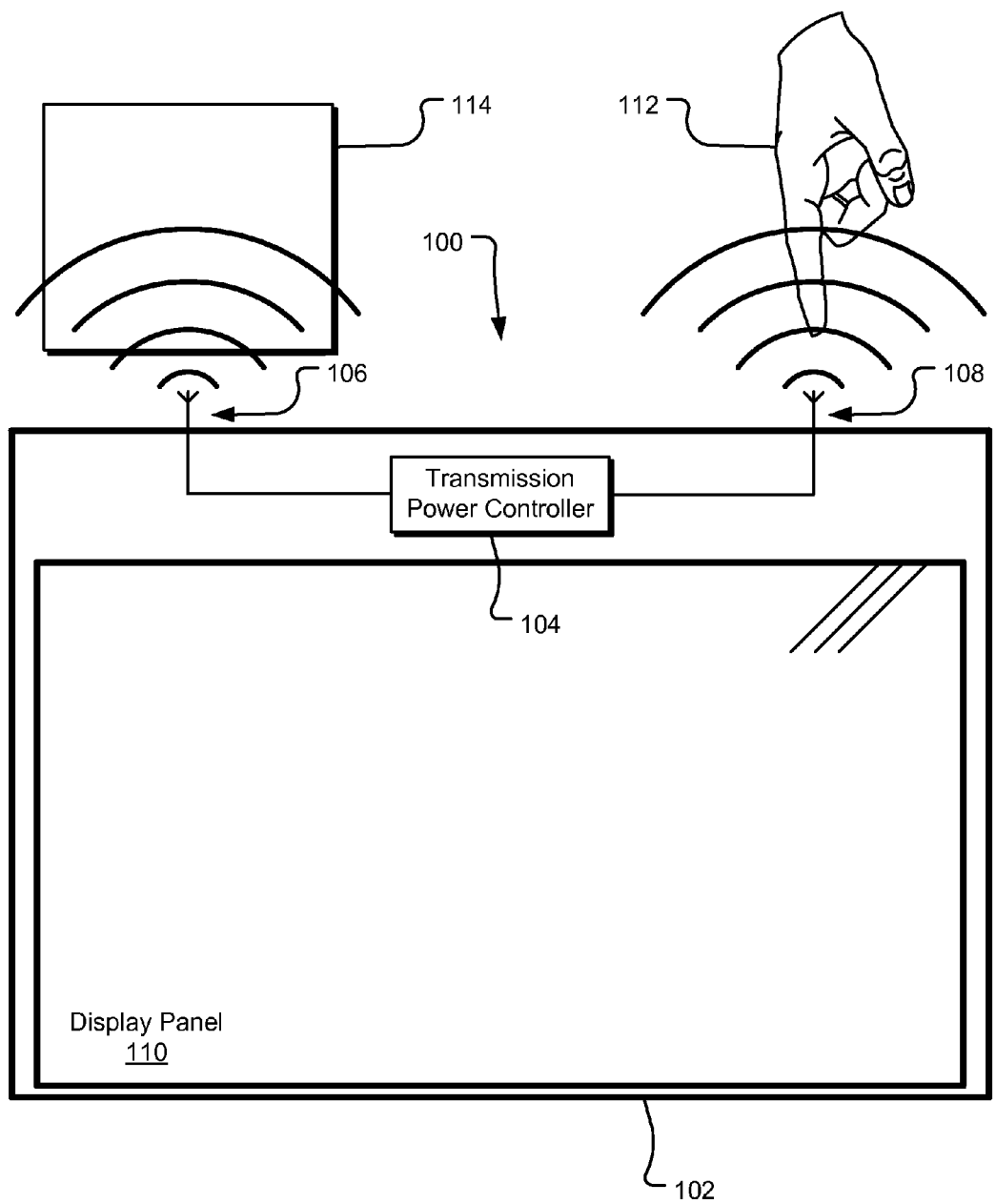
FIG. 1 illustrates an example system for selectively adjusting radio frequency (RF) transmission power in the context of specific absorption rate (SAR) standards.

FIG. 1 illustrates an example system 100 for selectively adjusting radio frequency (RF) transmission power in the context of specific absorption rate (SAR) standards. An electronic device 102 includes a transmission power controller 104 and one or more RF transmission sources connected to antennas, such as antennas 106 and 108. Typically, the antennas 106 and 108 are positioned internally to a case enclosing the electronic device 102, although the antennas 106 and 108 are shown external to the case in order to illustrate the concept of proximity to various bodies (e.g., human tissue 112, a non-human object 114). The electronic device 102 may also include, for example, a display panel 110 and internal electronic components, such as memory, one or more processors, input and output interfaces, a power supply, and other components.

The transmission power controller 104 distinguishes between non-human objects and human tissue in the proximity of an RF transmission source of the system 100. During operation, the electronic device 102 can be held by a human, for example, along the top edges of the electronic device 102. If the human tissue is detected, the detection would cause the transmission power controller 104 to reduce transmission power of RF transmission sources in the proximity of human tissue 112 in compliance with SAR standards. In contrast, when the electronic device 102 is laying on a table, the table may be detected as a non-human object 114 in the proximity of the RF transmission sources. Detection of the non-human object would otherwise cause the transmission power controller 104 to reduce transmission power of RF transmission sources in the proximity of the table. This latter example is unnecessary to comply with SAR standards, as SAR standards do not apply to non-human tissue. However, enhancements to the transmission power controller 104 allow it to distinguish between human tissue in the proximity and non-human objects in the proximity. Accordingly, in one implementation, transmission power supplied by the transmission power controller 104 to the antenna 108 would be reduced to comply with SAR standards while transmission power supplied by the transmission power controller 104 to the antenna 106 would not be reduced. Other adjustments schemes may also be employed.

Figure 2:
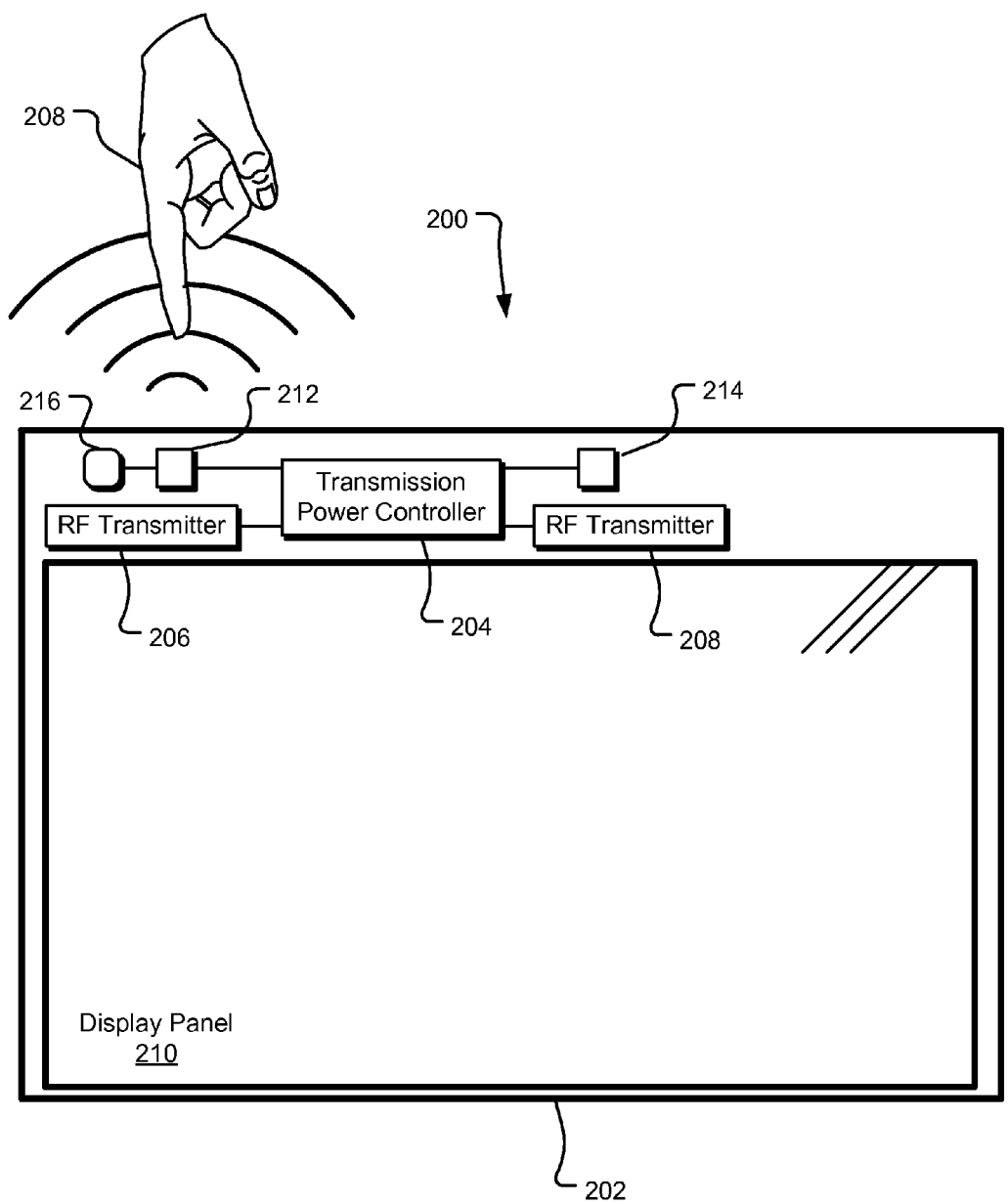
FIG. 2 illustrates another example system for selectively adjusting RF transmission power in the context of SAR standards.

FIG. 2 illustrates another example system 200 for selectively adjusting RF transmission power in the context of SAR standards. An electronic device 202 includes a transmission power controller 204 and RF transmitters 206 and 208 (e.g., transmission sources). Typically, the RF transmitters 206 and 208 are positioned internally to a case enclosing the electronic device 202. The electronic device 202 may also include, for example, a display panel 210 and internal electronic components, such as memory, one or more processors, input and output interfaces, a power supply, and other components.

A proximity sensor pad 212 is positioned near the RF transmitter 206 to detect objects entering the proximity of the RF transmitter 206. Likewise, a proximity sensor pad 214 is positioned near the RF transmitter 208 to detect objects entering the proximity of the RF transmitter 208. In one implementation, the RF transmitter 206 may represent a mobile broadband transmitting antenna while the RF transmitter 208 may represent another mobile broadband transmitting antenna, a WiFi transmitting antenna, etc. Various combinations may be employed. The proximity sensor pads 212 and 214 are designed to detect external capacitive coupling changes caused by the nearness of a conductive object near the RF transmitters 206 and 208 respectively. The detection capabilities of the proximity sensor pads 212 and 214 are also sensitive to ambient environmental conditions, such as changes in temperature and/or humidity, in that both temperature and humidity can alter the capacitive response of the proximity sensor pads 212 and 214. Alternatively or additionally, object proximity may be detected using capacitive sensors used in touch screens, track pads, and other input components in the electronic device 202.

A reference pad 216 is also positioned near the RF transmitter 206. The reference pad 216 is a sensor designed to be insensitive to (e.g., independent of) capacitance changes caused by external objects in its proximity but nevertheless remains sensitive to ambient environmental conditions, such as changes in temperature and/or humidity. In one implementation, the reference pad 216 is enclosed in a jacket that shields the reference pad 216 from external capacitance changes while still allowing sensitivity to ambient environmental condition induced internal capacitance changes. These internal capacitance changes detected by the reference pad 216 are substantially linearly proportional to ambient environmental conditions induced capacitance changes in the proximity pads 212 and 214. As such, the reference pad 216 acts as an ambient environmental conditions sensor, with regard to at least temperature and/or humidity, and provides a reference or compensation signal to the transmission power controller 204. The reference signal is used to remove the effects of temperature and humidity from proximity signals received from the proximity sensor pads 212 and 214.

As an object (whether human tissue or not) enters a proximity of the capacitive sensor 212, the capacitive sensor 212 experiences a change in capacitive coupling reflected as a change in a primary proximity signal the capacitive sensor 212 sends to the transmission power controller 204. In this example, the capacitance is measured from the capacitance sensor 212 to ground. The transmission power controller 204 also receives other signals, including a reference signal from the reference pad 216, a secondary proximity signal from the capacitive sensor 214, and other contextual signals, such as motion signals (e.g. from an accelerometer, gyroscope, and/or compass), camera and microphone signals, touch screen input signals, and other sensor based signals. Based on these inputs, the transmission power controller 204 determines whether a human tissue object (such as the hand 208) has entered the proximity field of the RF transmitter 206. If so, the transmission power controller 204 reduces the transmission power of the RF transmitted 206 in an effort to comply with SAR standards and/or to otherwise protect the human tissue from negative effects of the RF transmission signal.

Figure 3:
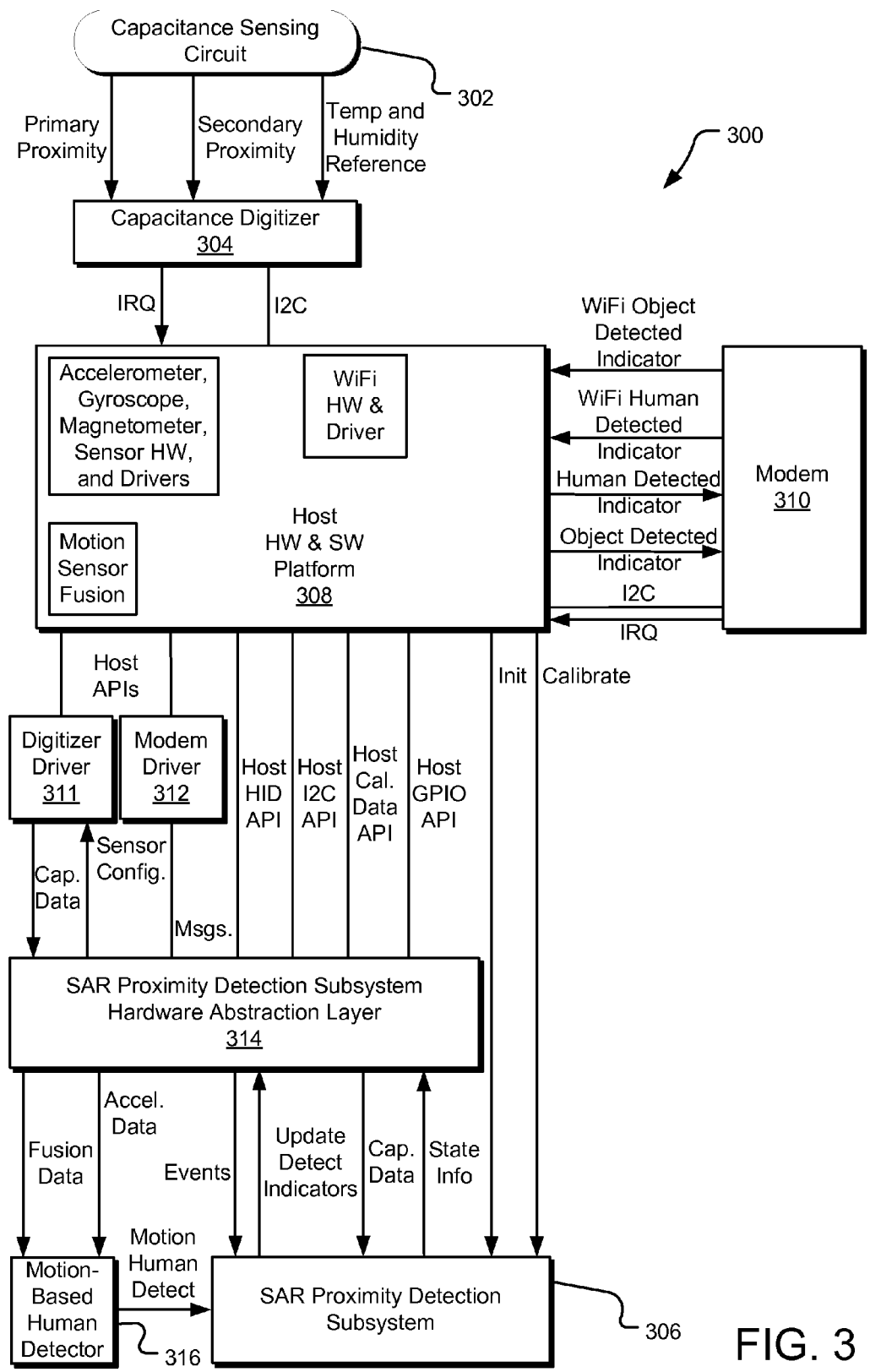
FIG. 3 illustrates an example architecture for a system that selectively adjusts RF transmission power in the context of SAR standards.

FIG. 3 illustrates an example architecture 300 for a system (e.g., an electronic device) that selectively adjusts RF transmission power in the context of SAR standards. At a high level, the architecture 300 for the system combines temperature/humidity compensated proximity signals with motion-based human detection to distinguish between human tissue and non-human tissue objects in the proximity of individual RF transmitters. In this manner, the system can more selectively adjust transmission power in compliance with SAR standards.

A capacitance sensing circuit 302 includes one or more proximity sensor pads and a reference pad. In FIG. 3, the capacitance sensing circuit 302 is shown as having two proximity sensor pads: a primary proximity sensor pad (closest to the RF transmitter) outputting a primary proximity signal, and a secondary proximity sensor pad (farthest from the RF transmitter) outputting a secondary proximity signal to a capacitance digitizer 304. The reference pad of the capacitance sensing circuit 302 outputs a temperature and humidity reference signal ("T and H Reference") to the capacitance digitizer 304. The reference pad of the capacitance sensing circuit 302 is designed to be insensitive to (e.g., independent of) capacitance changes caused by external objects in its proximity but nevertheless remains sensitive to temperature and humidity induced capacitive changes in an amount that is substantially linearly proportional to temperature and humidity induced capacitance changes in the other proximity pads of the capacitive sensing circuit 302.

In one implementation, during full-power, normal operation, the capacitance digitizer 304 is configured to sample three sensor inputs or stages of the capacitance digitizer 304 every 9 milliseconds, where each sample comprises an unsigned 16-bit number that is proportional to the capacitive proximity signal or capacitive reference signal received at the corresponding input or stage. During low-power, connected standby operation, the capacitance digitizer 304 is configured to sample the three sensor inputs or stages every 800 milliseconds. Full-power operation uses about six milliWatts of power while low-power operation uses about one milliWatt of power.

A SAR proximity detection subsystem 306 polls capacitive sensor data digitized by the capacitance digitizer 304 and executes a detection process that distinguishes between human tissue and a non-human object in proximity of a transmission source. Example polled sample rates from 1 Hz to 10 Hz are employed where the sample rate is relatively stable (+/−5% variability in the sampling interval from sample to sample), although other sample rates may alternatively be employed. For example, slower sample rates increase the amount of time to detect an object in proximity because the digital filtering transient response takes longer to complete. In this scenario, the recommended sample rate for fastest performance is approximately 10 Hz, because the higher sampling rate allows the architecture 300 to be more responsive to changes in capacitive sensor data. If low power operation is employed (e.g., where the sample rate of 10 Hz cannot be achieved in some systems), then reducing the sample rate to a fixed lower rate is acceptable but may reduce performance. In yet another example, if a reduced sample rate is used, changes in sample rate may introduce a stabilization time for digital filters (e.g., their transient response time) in the system 300. Such polling can provide a more efficient power utilization than using internal sampling rates of the capacitance digitizer 304. The SAR proximity detection subsystem 306 can be implemented in circuitry or in a combination of circuitry, one or more processors, and software or firmware instructions.

In general, increases in temperature and humidity increase the sensed capacitance measured by a capacitance digitizer and a capacitive sensor pad, such as a proximity pad or a reference pad, and decreases in temperature and humidity decrease the sensed capacitance measured by a capacitance digitizer and a capacitive sensor pad. Accordingly, the architecture 300 provides compensation for the effects of temperature and humidity experienced by a capacitance sensing circuit.

In one implementation, the capacitance digitizer 340 has a dynamic range of +/−20 pF with an input range of +/−2 pF. The capacitance digitizer 340 employs offsets (AFE offsets or Analog Front End offsets) to adjust the baselines of the incoming proximity and reference signals. However, extreme sensitivity of the capacitance digitizer 340 to even very small differences in circuit component values in individual systems can result in different AFE offsets appropriate for zeroing-out the digitized capacitive input signals for each system. Additionally, even an accurate AFE offset may not fully zero-out the digitized sensor values, so an additional compensating DC offset is used to further reduce the ambient component of the capacitive input signal (e.g., as calibrated with no objects in proximity at room temperature and humidity).

As such, the compensating DC offset is determined from a calibration capability of the system 300. A calibration is performed to determine appropriate AFE offsets for each input with which to configure the capacitance digitizer 304. In addition to the AFE offsets, calibration also determines appropriate DC offset for zeroing-out the digitized capacitive inputs with the determined AFE offsets. Once determined, the AFE offsets and the DC offsets are stored and re-used later during initialization, as they do not tend to change as long as the hardware platform does not change. Note: Individual systems can have different AFE offsets and DC offsets, at least in part because of variations in system component values.

The capacitive sensing circuit 302, the capacitance digitizer 304, and the SAR proximity detection subsystem 306 coordinate with a host hardware and software platform 308 to provide selective SAR adjustment information, which is used by the host hardware and software platform 308 to adjust transmission power of a modem 310 (an example RF transmitter). The host hardware and software platform 308 synchronizes and receives digitized capacitance samples (e.g., relating to the primary proximity signal, the secondary proximity signal, and the reference signal) from the capacitance digitizer 304 via an interrupt signal channel (IRQ) and an I²C (or other interface).

The hardware and software platform 308 (e.g., a tablet computer, a mobile smart phone, a laptop computer, a wearable device, or other device) includes, among other components, one or more of the following:
  One or more accelerometers
  One or more gyroscopes
  One or more magnetometers
  Sensor hardware
  Driver software
  Motion sensor fusion circuitry and/or software
  Communication hardware and driver software (e.g., WiFi modem interface hardware and software)

Other sensors may also be employed, such as one or more barometers, a touch screen, one or more cameras, one or more microphones, accelerometers, gyroscopes, compasses, and other sensors. The various accelerometers, gyroscopes, magnetometers, and other sensors represent motion sensor components, the output signals of which the motion sensor fusion circuitry and/or software combines to better capture a particular motion event than any single constituent sensor input. The motion sensor fusion circuitry and/or software can also manage calibration of the various sensors, turn on/off the gyroscope(s), and manage sensor power consumption.

The hardware and software platform 308 communicates, in part, with the SAR proximity detection subsystem 306 and a motion-based human detector 316 by signaling through a digitizer driver 311, a modem driver 312, and a hardware abstraction layer 314. The hardware abstraction layer 314 allows the SAR proximity detection subsystem 306 and the motion-based human detector 316 to be platform-independent, thereby allowing them to work without modification (or without significant modification) with other host hardware and software platforms.

The motion-based human detector 316 uses the platform-specific 3-axis accelerometer and motion sensor fusion data to detect human motion and improve the accuracy of the SAR proximity detection subsystem 306. The motion-based human detector 316 determines whether motion that is expected to be human-based motion is being experienced by the device or whether the device is oriented in a manner that indicate that a human would not be using the system (e.g., face-down for a long period of time). As a result, in one implementation, the motion-based human detector 316 determines whether the detected motion increases the probability that human tissue is in the proximity field of the proximity sensor. The motion-based human detection state is used to adjust the confidence of human presence and therefore to assist in selectively adjusting the RF transmission power in the proximity of human tissue.

At the end of each cycle of the SAR proximity detector subsystem 306, the object and human detect indicators are updated. The modem 310 uses to determine whether a reduction in RF transmission power is appropriate. For example, in a four-state detect indication system, if the object detect indicator indicates that an object is detected in proximity of an RF transmitter but the human detect indicator does not indicate that a human is detected in the proximity, then no RF transmission power reduction is appropriate. Alternatively, if both the human detect indicator indicate that a human/object is detected in proximity of an RF transmitter, then RF transmission power reduction is appropriate. If neither indicator indicates detection of a human/object, then no RF transmission power reduction is appropriate. Finally, if the human detect indicator indicates a human in the proximity but the object detect indicator does not indicate an object in the proximity, then RF transmission power reduction is appropriate.

The modem 310 also passes the detection status information to the WiFi driver in the host hardware and software platform 308, which can also reduce RF transmission power of individual RF transmitters. The modem 310 may also request other status information from the SAR proximity detector subsystem 306, such as a human detect confidence value.

Figure 4:
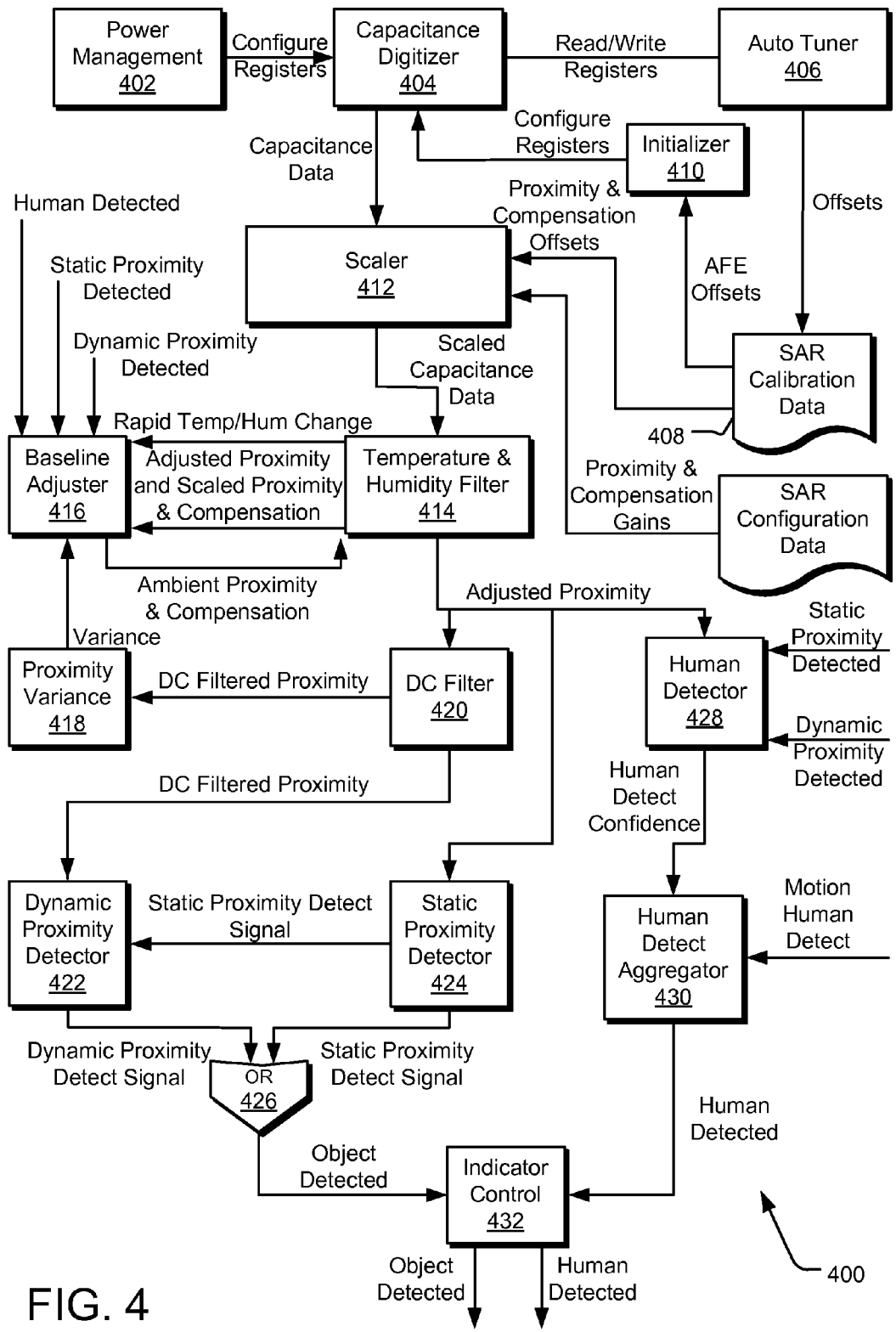
FIG. 4 illustrates components of an example SAR proximity detection subsystem that selectively adjusts RF transmission power in the context of SAR standards.

FIG. 4 illustrates components of an example SAR proximity detection subsystem 400 that selectively adjusts RF transmission power in the context of SAR standards. Given raw digitized capacitance data from the three sensed inputs (e.g., a primary proximity signal, a secondary proximity signal, and a reference/compensation signal), the SAR proximity detection subsystem 400 performs one or more the following operations, in one implementation:

1. The SAR proximity detection subsystem 400 scales the raw digitized capacitance data from the three sensed inputs (e.g., the primary proximity signal, the secondary proximity signal, and the reference signal) based on the pre-calibrated gains for each channel, providing scaled primary proximity data, scaled secondary proximity data and scaled compensation data.
2. The SAR proximity detection subsystem 400 filters temperature and humidity effects from the scaled proximity data and the scaled compensation data.
3. The SAR proximity detection subsystem 400 performs "dynamic detection," detecting the proximity of objects (whether human tissue or not) quickly moving within the proximity field.
4. The SAR proximity detection subsystem 400 performs "static detection," detecting the proximity of very slow moving or stationary objects (whether human tissue or not) within the proximity field, which is particularly useful in detecting objects in the proximity field at power-up.
5. The SAR proximity detection subsystem 400 performs "human detection," detecting the presence of a large (e.g., torso, thigh, etc.) human-like object within the proximity field based on a correlation of the proximity data to a human-like template. Other data, including motion-based human detection data, may be aggregated with this correlation to provide more confidence in human tissue detection.

6. The SAR proximity detection subsystem 400 adjusts the ambient proximity by up to a predetermined margin (e.g., two counts/second) when the proximity variance satisfies a variance condition (e.g., when the proximity variance is low enough for a long enough period of time). In one implementation, this type of adjustment occurs when no object is currently detected using one of the object detection operations and when no human was detected within the previous seventy seconds.

7. The SAR proximity detection subsystem 400 adjusts the current ambient proximity by the change in compensation detected since the last ambient proximity update. In one implementation, this type of adjustment may occur on a cold-boot, when exiting connected standby, or when an object has only been statically detected (e.g., not dynamically or human detected) and has not been updated for at least twenty seconds.

8. The SAR proximity detection subsystem 400 adjusts the ambient compensation up by a predetermined margin (e.g., two counts/second).

9. The SAR proximity detection subsystem 400 monitors for rapid persistent changes in the compensation signal received from the reference pad and flags an "ambient proximity and compensation update" to occur once the compensation signal has settled.

10. The SAR proximity detection subsystem 400 updates the object and human detect indicators.

The operations above are given in a specified order, although some operations may be re-ordered depending on, without limitation, engineering, power, and/or timing considerations.

A power management circuit 402 provides power state information from the host system and the modem to the SAR proximity detection subsystem 400, which is able to dynamically reconfigure a capacitance digitizer 404 into different power states. In this manner, the capacitance digitizer 404 can use as little as one milliWatt or as much as six milliWatts of power. For example, when the RF transmitter is not transmitting, registers in the capacitance digitizer 404 are configured in a power state that consumes less power in comparison to when the RF transmitter is transmitting. In some power states, the SAR proximity detection subsystem 400 configures registers in the capacitance digitizer 404 to run in a low power state (e.g., one milliWatt) while still sampling capacitance data at a reduced rate of 1 Hz. Such operation can be useful in allowing the SAR proximity detection subsystem 400 to update its ambient proximity and compensation signals with capacitive changes caused by environmental changes in temperature and/or humidity.

An auto tuner 406 interfaces with the capacitive digitizer 404 at calibration time to calibrate the AFE, proximity, and compensation offsets, which are stored in memory as SAR calibration data 408. The AFE offsets are fed back through an initializer 410 to configure registers in the capacitance digitizer 404 at calibration time. The AFE offsets provide initial adjustments to the raw capacitance signals received from the three capacitive sensor pad inputs.

The proximity and compensation offsets are passed to a scaler 412, which scales the proximity and compensation data (i.e., capacitance data) received from the capacitance digitizer 404, based on the proximity and compensation offsets. Each channel has its own gain adjustment based on a corresponding offset, which is determined from empirical test data at design and/or manufacture time and stored in the memory of SAR calibration data 408.

The scaled capacitance data ($Prox_{scaled}$ and $Comp_{scaled}$) is passed to a temperature and humidity filter 414, which at least partially removes effects of changes in capacitance due to environmental conditions altered by changes in temperature and/or humidity. The SAR proximity detection subsystem 400 applies Equation 1 (below) to generate an adjusted proximity signal.

$$Prox_{adj} = Prox_{scaled} - Comp_{scaled} - Prox_{ambient} \qquad (1)$$

The temperature and humidity filter 414 computes the ambient proximity signal ($Prox_{ambient}$) from the current proximity offset received from the memory of SAR calibration data 408, which is further adjusted based on changes in temperature and/or humidity by a baseline adjustment operation. The temperature and humidity filter 414 also monitors the scaled compensation signal received from the scaler 412 to detect rapid changes in the scaled compensation signal. Such rapid changes are indicative of rapid temperature and/or humidity changes in the proximity field. The monitoring operation of the temperature and humidity filter 414 detects the amount of signal change in the scaled compensation signal over a window of time and determines whether the scaled compensation signal changes satisfies a rapid change condition (e.g., changes exceed a rapid change threshold for multiple consecutive checks). If the rapid change condition is satisfied, then the temperature and humidity filter 414 indicates a rapid temperature and/or humidity change event to a baseline adjuster 416.

The baseline adjuster 416 determines the current ambient proximity to remove the effects of temperature and/or humidity changes from the scaled proximity (capacitance) signal received by the temperature and humidity filter 414 from the scaler 412. In one implementation, changes in temperature and/or humidity can result in changes in digitized proximity capacitance of 1000 counts or more, and these changes can result in false proximity triggers. By filtering out the effects of temperature and/or humidity changes from the scaled proximity (capacitance) signal, the proximity detectors provide much more accurate results under varying environmental conditions (e.g., temperature and/or humidity changes).

In one implementation, subtracting the scaled compensation signal from the scaled proximity signal, both being represented by scaled capacitance data received from the scaler 412, the temperature and humidity filter 414 can remove the effects of temperature and/or humidity within about fifty counts. For example, when tracking the proximity over temperature and humidity with the ambient proximity removed and no objects near the capacitive sensor pads, one would expect to see a flat line response. However, the resulting signal will typically float around a variance of about fifty counts or +/−25 counts of some middle baseline. To make this response closer to flat, the baseline adjuster 416 adjusts the ambient proximity whenever the variance of the (DC-filtered) adjusted proximity is within an acceptable margin for a sufficient period of time and no object has been detected within the proximity field. The variance is provided to the baseline adjuster 416 by a proximity variance component 418 based on a DC-filtered proximity signal derived from the adjusted proximity signal by a DC filter 420. The DC filter 420 removes the DC offset from the adjusted proximity signal in preparation for processing by the dynamic proximity detector 422. In one implementation, the DC filter 420 includes a differentiator followed by a leaky integrator, which in combination perform an efficient high-pass filter operation.

The proximity variance component 418 determines when ambient conditions exist (so that the proximity and compensation baselines can be updated). Existence of ambient conditions is derived from the DC-filtered proximity signal originating from the DC-filter 420 using a weighted average for computing the mean and mean squared. Empirical data shows that the proximity variance is continuously low when no objects are within the proximity field, so the proximity variance provides a good gate for updates to the ambient proximity and compensation signals.

In one implementation, the baseline adjuster 416 performs a rate-limited (e.g., two counts/second) update of the ambient proximity and compensation signals when the DC-filtered proximity variance is below a predetermined margin of counts (e.g., 10 counts) for at least a predetermined period of time (e.g., 1 second), the static and dynamic detectors are not triggered, and the human detector has not been triggered for a predetermined period of time (e.g., 70 seconds). The rate limit is based on analysis of received digitized proximity and compensation capacitance data, which demonstrates that rapid changes in environmental conditions (e.g., changes in temperature and/or humidity) do not cause more than a predetermined (e.g., 2 counts/second) change in digitized capacitance. Nevertheless, other rate limits, margins, and time periods may be employed. Using the described implementation, the ambient compensation is updated by the difference in current scaled compensation and current ambient compensation, with the difference rate limited to the predetermined limit (e.g., 2 counts/second).

In another implementation, the baseline adjuster 416 updates the ambient proximity and compensation based on the current scaled proximity and compensation signals received if a rapid temperature and/or humidity change event is detected by the temperature and humidity filter 414. In this scenario, at least two options may be employed to update the ambient proximity, although the ambient compensation is updated with the current scaled compensation signal under either option. Under a first option, the baseline adjuster 416 sets the ambient proximity to the difference between the current scaled proximity and current scaled compensation signals. Under a second option, a human is currently detected, so the baseline adjuster 416 adjusts the ambient proximity by the different between the current scaled compensation signal and the current ambient compensation signal. The at least two options account for scenarios when a human is detected by the proximity signal. In these scenarios, the human's presence provides a significant contribution to the external capacitive changes so the current scaled compensation signal is used, instead of the current scaled proximity, because it is insensitive to object proximity.

A static proximity detector 424 indicates an object is detected in the proximity field if the adjusted proximity signal satisfies a static proximity condition (e.g., exceeds a static proximity threshold). Once triggered, the static object detect state resets after the adjusted proximity no longer satisfies the static proximity condition for a predetermined period of time (e.g., 1 second). The status proximity detect signal is passed to the dynamic proximity detector 422 and to a logical OR operator component 426.

The dynamic proximity detector 422 indicates an object is detected if the DC-filtered adjusted proximity signal satisfies a dynamic proximity condition (e.g., exceeds a dynamic proximity threshold). Once triggered, the dynamic object detect state resets after one or more of the following conditions is satisfied, as determined by the logical OR operator component 426:

1. The DC-filtered adjusted proximity signal satisfies a dynamic detect reset condition (e.g., the DC-filtered adjusted proximity signal is more negative than a negative dynamic detect threshold for at least two samples).
2. The static proximity detect signal is reset for a predetermined number of samples (e.g., 2 samples).

A human detector 428 uses a correlation filter to determine whether the incoming adjusted proximity signal correlates with a human-like template. Empirical data indicates that a good template to use for detecting human-like proximity objects is a step function over a predetermined period of time (e.g., 5 seconds) and a correlation satisfying a human correlation condition (e.g., exceeding 0.8). If the incoming adjusted proximity signal correlates with the template to satisfy the human correlation condition, the human detector 428 indicates that the proximity sensor pad is placed in proximity with a sufficiently large portion of a human body, such as a lap, stomach, or large forearm, to have confidence that human tissue is in the proximity field. Each time the human detector 428 satisfies the human correlation condition and either the static detector or dynamic detector is triggered, a human detect confidence is incremented by a percentage and increases again after the correlation stops satisfying the human correlation condition (e.g., falls below 0.8). If the correlation continues to fail to satisfy the human correlation condition (e.g., stays below 0.8) for a predetermined period of time, the human detect confidence is reduced by a percentage until it reaches a neutral level (e.g., zero).

Figure 5:
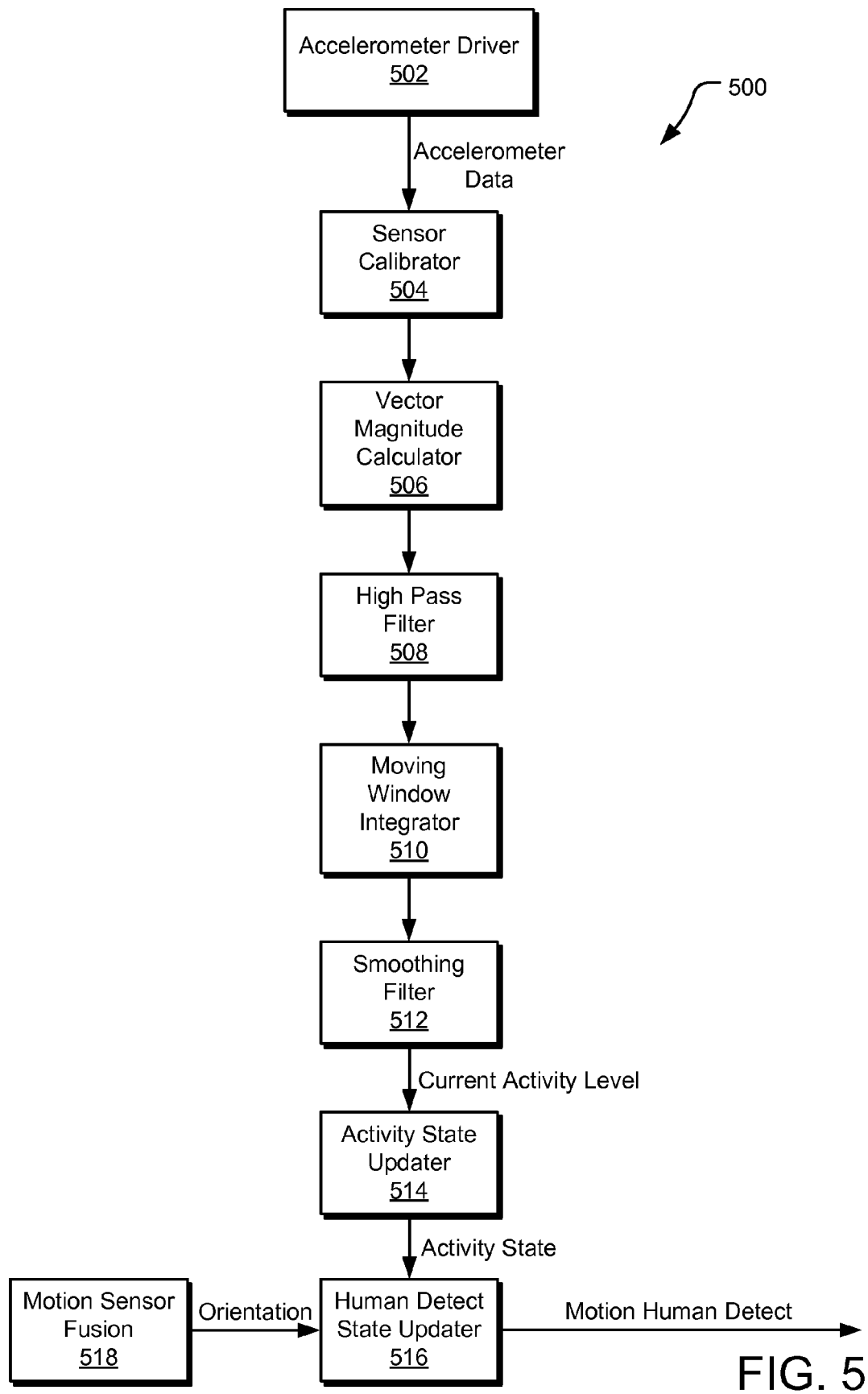
FIG. 5 illustrates components of an example motion-based human detect subsystem used in selectively adjusting RF transmission power in the context of SAR standards.

A human detect aggregator 430 scales the human detect confidence signal received from the human detector 428 based on the motion-based human detector trigger state received from the motion-based human detect subsystem (see the motion-based human detector 316 in FIG. 3 and the motion-based human detect subsystem 500 in FIG. 5). The human detect aggregator 430 effectively increases the confidence of human detection results when both human detectors (e.g., the motion-based human detect subsystem and the human detector 428) detect a human in the proximity field.

In one implementation of the human detector 428 and human detect aggregator 430, the human detector 428 processes the adjusted proximity (e.g., which may include up to N of channels adjusted proximity) and computes a confidence of human tissue presence for each channel as a human detect confidence signal for each channel (e.g., based on satisfaction of the human correlation condition). These N human detect confidence signals are then input to the human detect aggregator 430, which increases each human detect confidence signal by a scale factor if the motion-based human detector trigger state indicates the presence of a human. The human detect confidence signals are tested against a human detection filter condition (e.g., whether any human detect confidence signals equals or exceeds a human detect threshold). If the condition is satisfied, then the human detect aggregator 430 outputs a human detected signal to an indicator control 432 indicating that a human has been detected. If the human detected signal is triggered, it remains triggered until the human detect confidence signals decrease to a neutral value (e.g., zero). The human detect confidence signals are gradually reduced (e.g., by 25% increments) once the human correlation condition is no longer satisfied in the human detector 428 for a predetermined period of time (e.g., 7 seconds).

The indicator control 432 receives the object detected signal from the logical OR operator component 426 and the human detected signal from the human detect aggregator 430 and outputs the two indicators, one indicating whether any object was detected and the other indicating whether human tissue was detected. Based on these outputs, the SAR proximity detection subsystem 400 can adjust the transmission power of an RF transmitter to comply with SAR standards and/or to otherwise protect the human tissue from negative effects of the RF transmission signal.

FIG. 5 illustrates components of an example motion-based human detect subsystem 500 used in selectively adjusting RF transmission power in the context of SAR standards. The motion-based human detect subsystem 500 uses 3-axis accelerometer data along with orientation data from a motion-based sensor fusion operation to determine whether the electronic device is experiencing motion that could be caused by a human. The motion-based human detect subsystem 500 integrates the relative motion within a window of time and then determines whether the integrated sum satisfies a human motion condition (e.g., the sum exceeds a human motion threshold).

In one implementation, the motion-based human detect subsystem 500 receives accelerometer data from an accelerometer driver 502, which is an interface to accelerometer sensors (not shown). A sensor calibrator 504 applies calibration offsets and/or gain adjustments to the accelerometer data. A vector magnitude calculator component 506 computes a 3-axis accelerometer vector from the adjusted accelerometer data. A high-pass filter 508 filters the magnitude of the 3-axis accelerometer vector at the full accelerometer sample rate to remove a DC offset. A moving window integrator 510 performs a predetermined time window (e.g., one second) integration of the high-pass filtered accelerometer vector. A smoothing filter 512 filters the integrated result received from the moving window integrator 510 to yield the current activity level.

An activity state updater 514 updates an activity hysteresis periodically (e.g., every ten seconds) based on the maximum activity level since the last update was performed. Within each period (e.g., each ten second interval), the current activity level is monitored and the maximum activity level detected over that period is tested against a stationary condition (e.g., an empirically determined activity level threshold.) If the maximum activity level (as indicated by the activity hysteresis) satisfies a stationary condition (e.g., is less than or equal to a stationary threshold), then the activity hysteresis is reduced (but not below zero). If the maximum activity level does not satisfy a stationary condition (e.g., is above a stationary threshold), then the activity hysteresis is increased (but not above its maximum value). The activity hysteresis data provides an activity state result.

A human detect state updater 516 updates the activity state using orientation information from a motion sensor fusion component 518. If the device orientation satisfies a stability condition (e.g., the orientation has not changed by more than 1.2 degrees for at least ten seconds) and the device orientation is such that the RF transmit antenna(s) could not be near a large human body part, then indicate that no human is detected. If the device orientation satisfies the stability condition and the stationary condition and the device orientation is such that the RF transmitter antenna(s) could be near a large human body part, then indicate that no human is detected. Note that a dead band may exist between the stationary condition and the active threshold to prevent rapid changes in the accelerometer human detect state. If the device orientation satisfies the stability condition but not the stationary condition and the device orientation is such that the RF transmitter antenna(s) could be near a large human body part, then indicate that a human is detected. Note that a dead band may exist between the stationary condition and the active threshold to prevent rapid changes in the accelerometer human detect state.

Responsive to the updating of the human detect state, the human detect state updater 516 outputs a motion human detect signal to the human detect aggregator of the SAR proximity detection subsystem.

Figure 6:
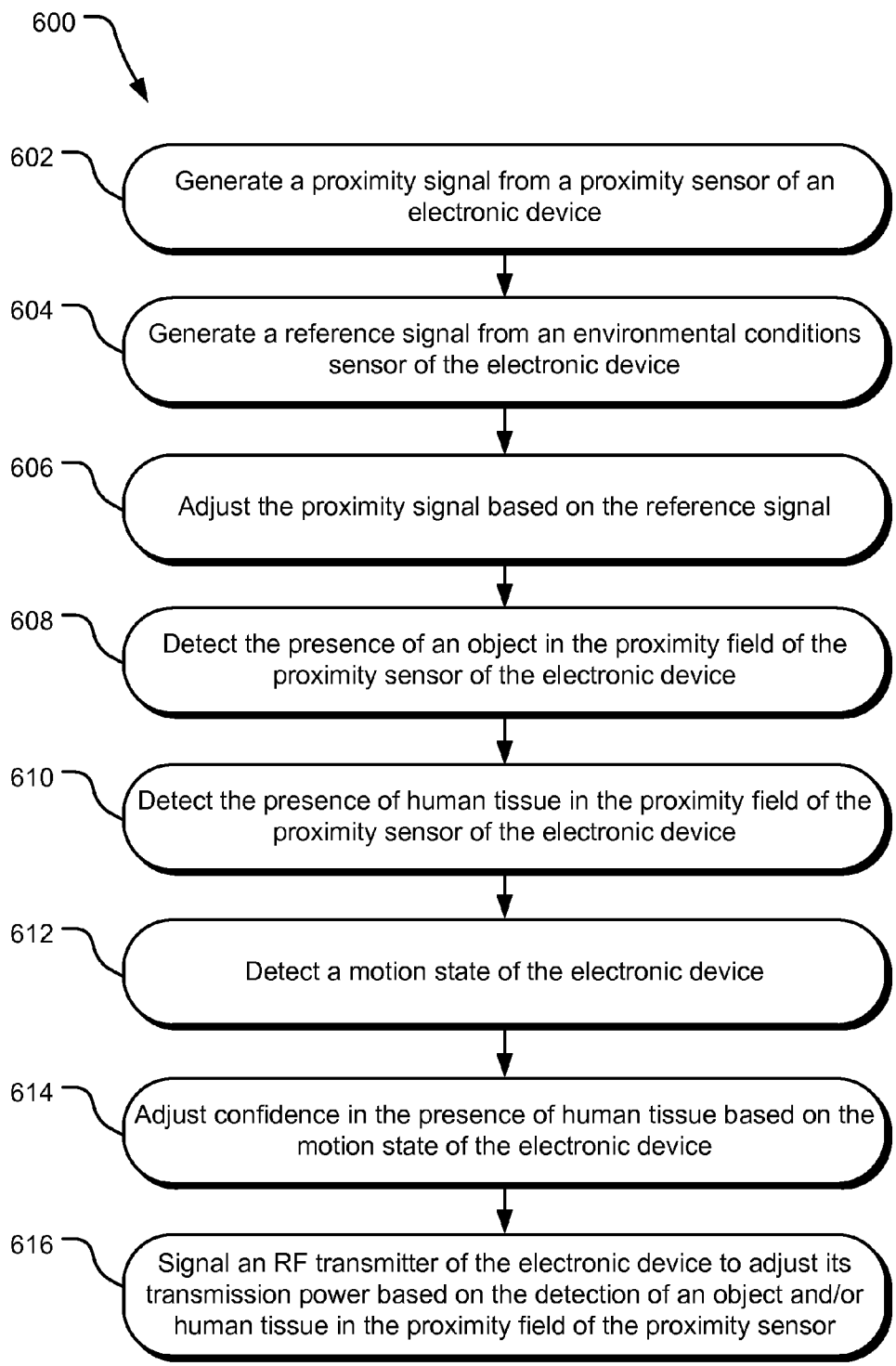
FIG. 6 illustrates example operations for selectively adjusting RF transmission power in the context of SAR standards.

FIG. 6 illustrates example operations 600 for selectively adjusting RF transmission power in the context of SAR standards. A generating operation 602 generates a proximity signal from a proximity sensor of an electronic device. The proximity sensor detects changes in capacitive coupling within a proximity field of the proximity sensor, and the proximity sensor is also sensitive to ambient environmental conditions, such as changes in temperature and humidity. This sensitivity is reflected in the generated proximity signal (as an ambient environmental conditions offset in the proximity signal). Another generating operation 604 generates a reference signal from an environmental conditions sensor of the electronic device. The environmental conditions sensor is sensitive to ambient environmental conditions, such as changes in temperature and humidity but not to objects altering the capacitive coupling in the proximity of the environmental conditions sensor. As such, the environmental conditions sensor detects changes in the ambient environmental conditions on the environmental conditions sensor but is independent of objects in its proximity.

An adjusting operation 606 adjust the proximity signal based on the reference signal to filter out effects of ambient environmental conditions on the proximity sensor. A detecting operation 608 detects the presence of an object in the proximity field of the proximity sensor, whether the object is moving rapidly, moving slowly, or remaining stationary. Another detecting operation 610 detects the presence of human tissue in the proximity field of the proximity sensor of the electronic device. In one implementation, this detection is accomplished using a correlating filter to determine whether the adjusted proximity signal correlates with a human-like template.

Yet another detecting operation 612 detects a motion state of the electronic device to determine whether the electronic device appears to be handled by a human (e.g., based on expectations of movement and/or orientations believed to represent human handling). Another adjusting operation 614 adjusts confidence in the presence of human tissue based on the motion state (e.g., human-handled or not-human-handled) of the electronic device. A signaling operation 616 signals an RF transmitter of the electronic device to adjust its transmission power based on the detection of an object and/or human tissue in the proximity field of the proximity sensor. Such detection can be based on one or more of the detection and adjustment operation in operations 600.

Figure 7:
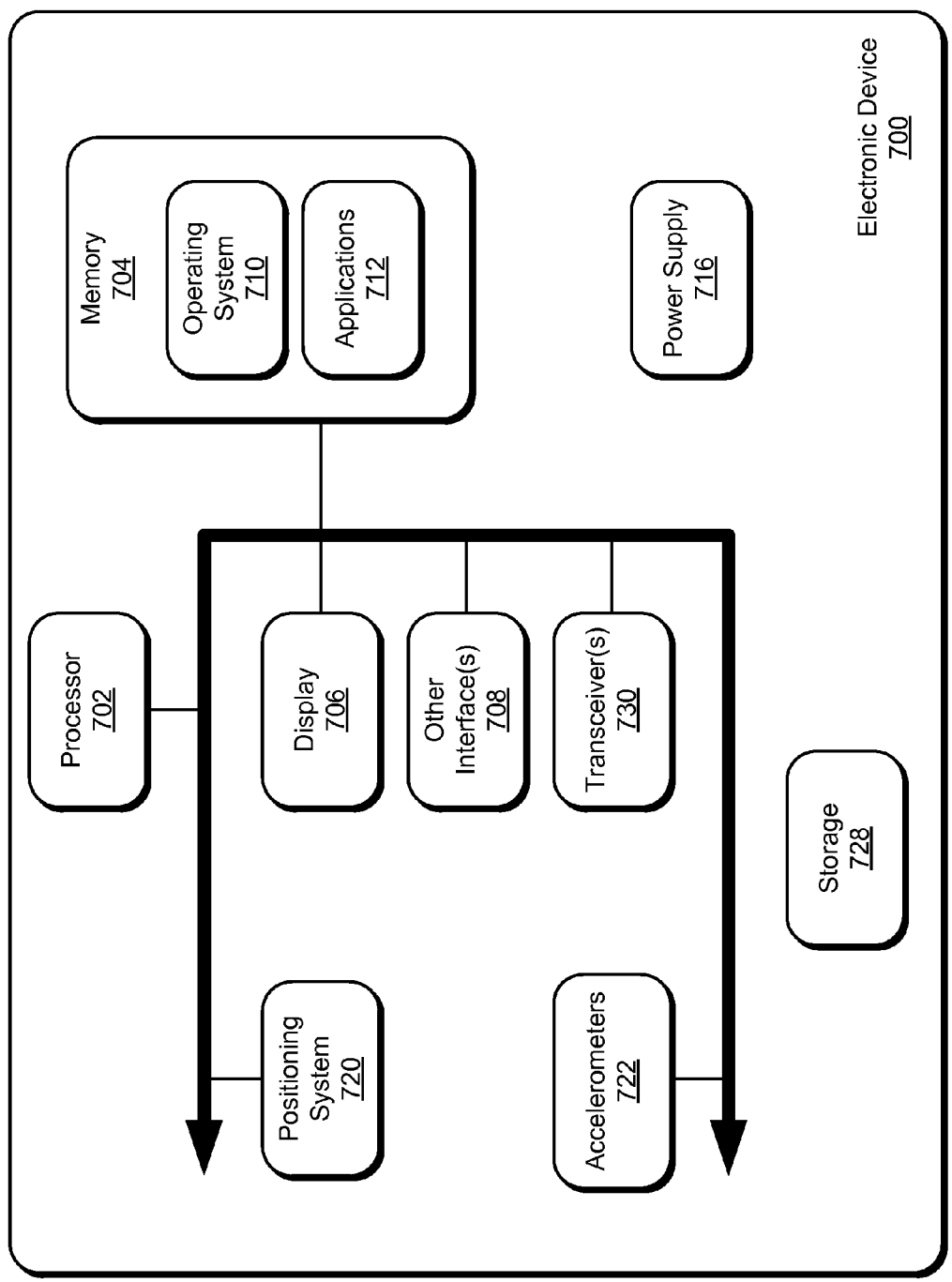
FIG. 7 illustrates an example electronic device useful for selectively adjusting RF transmission power in the context of SAR standards.

FIG. 7 illustrates an example electronic device 700 useful for selectively adjusting RF transmission power in the context of SAR standards. The electronic device 700, which may be embodied in a mobile electronic device, includes a processor 702, a memory 704, a display 706 (e.g., a touchscreen display), and other interfaces 708 (e.g., a keyboard). The memory 704 generally includes both volatile memory (e.g., RAM) and nonvolatile memory (e.g., flash memory). An operating system 710, such as a Microsoft Windows® operating system, resides in the memory 704 and is executed by the processor 702, although it should be understood that other operating systems may be employed.

One or more application programs 712 are loaded in the memory 704 and executed on the operating system 710 by the processor 702. Examples of applications 712 include without limitation instructions for processing proximity detection, motion detection, motion sensor fusion, static detection, dynamic detection, human detection, ambient condition filtering, proximity filter adjustment, etc. The electronic device 700 includes a power supply 716, which is powered by one or more batteries or other power sources and which provides power to other components of the electronic device 700. The power supply 716 may also be connected to an external power source that overrides or recharges the built-in batteries or other power sources.

The electronic device 700 includes one or more communication transceivers 730 to provide network connectivity (e.g., mobile phone network, WiFi®, BlueTooth®, etc.). The electronic device 700 also includes various other components, such as a positioning system 720 (e.g., a global positioning satellite transceiver), one or more accelerometers 722, and additional storage 728. Other configurations may also be employed.

In an example implementation, a proximity detection subsystem, a software platform, an operating system, various drivers, a hardware abstraction layer, and other modules may be embodied by instructions stored in memory 704 and/or storage devices 728 and processed by the processor 702. Applicable safety standards (e.g., SAR standards) and/or tables including transmission power adjustment values, thresholds, conditions, etc. may be stored in memory 704 and/or storage devices 728 as persistent datastores.

The electronic device 700 may include a variety of tangible computer-readable storage media and intangible computer-readable communication signals. Tangible computer-readable storage can be embodied by any available media that can be accessed by the electronic device 700 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by the electronic device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

In one example of the described technology, an electronic device includes an RF transmitter, a proximity sensor, and a proximity detection subsystem. The proximity sensor generates a proximity signal dependent on one or more ambient environmental conditions of the proximity sensor and dependent on proximity of an object in a proximity field of the proximity sensor. The proximity detection subsystem is communicatively coupled to the proximity sensor and the RF transmitter and adjusts the proximity signal by filtering out effects of the one or more ambient environmental conditions from the proximity signal. The adjusted proximity signal signals the RF transmitter with one or more object identification signals to adjust transmission power of the RF transmitter.

An example electronic device of the preceding example electronic devices can further include an ambient environmental conditions sensor positioned in proximity of the RF transmitter and the proximity sensor. The ambient environmental conditions sensor is communicatively coupled to the proximity detection subsystem. The ambient environmental conditions sensor generates a reference signal. The reference signal is independent of an object in the proximity field of the ambient environmental conditions sensor. The proximity detection subsystem adjusts the proximity signal based on the reference signal to filter out effects of the one or more ambient environmental conditions from the proximity sensor. The one or more ambient environmental conditions may include at least one of a temperature change or a humidity change.

In an example electronic device of any of the preceding example electronic devices, the proximity detection subsystem adjusts the proximity signal with a direct current offset, wherein the direct current offset is based on the reference signal.

In an example electronic device of any of the preceding example electronic devices, the proximity detection subsystem determines whether an object in the proximity field of the proximity sensor is stationary within the proximity field, wherein the one or more object identification signals are dependent upon whether an object is stationary in the proximity field of the proximity sensor.

In an example electronic device of any of the preceding example electronic devices, the proximity detection subsystem determines whether an object in the proximity field of the proximity sensor is moving within the proximity field, wherein the one or more object identification signals are dependent upon whether an object is moving within the proximity field of the proximity sensor.

In an example electronic device of any of the preceding example electronic devices, the proximity detection subsystem determines whether the adjusted proximity signal satisfies a human correlation condition indicating human tissue with the proximity field of the proximity sensor, wherein the one or more object identification signals are dependent upon whether an object includes human tissue within the proximity field of the proximity sensor.

In an example electronic device of any of the preceding example electronic devices, the proximity detection subsystem detects motion of the electronic device, determines whether the detected motion increases probability that human tissue is within the proximity field of the proximity sensor and increases confidence in detection of human tissue in the proximity field of the proximity sensor. The one or more object identification signals are dependent upon whether human tissue is present in the proximity field of the proximity sensor.

In an example electronic device of any of the preceding example electronic devices, the proximity detection subsystem outputs an object detect signal and a human detect signal as the one or more object identification signals for identification of a type of object in the proximity field of the proximity sensor of the electronic device.

In an example method, a proximity signal is generated from a proximity sensor of an electronic device. The proximity signal of the proximity sensor is dependent on one or more ambient environmental conditions of the proximity sensor and dependent on a presence of an object in a field of the proximity sensor. The proximity signal is adjusted by filtering out effects of the one or more ambient environmental conditions from the proximity signal based on a reference signal generated from an environmental conditions sensor positioned in proximity of an RF transmitter and the proximity sensor. The reference signal is independent of an object in the field of the proximity sensor. The RF transmitter is signaled with one or more object identification signals to adjust transmission power of the RF transmitter based on the adjusted proximity signal.

In an example method of any of the preceding example methods, the one or more ambient environmental conditions include at least one of a temperature change or a humidity change.

In an example method of any of the preceding example methods, the operation of adjusting the proximity signal includes adjusting the proximity signal with a direct current offset, wherein the direct current offset is based on the reference signal.

In an example method of any of the preceding example methods, the signaling includes determining whether an object in the field of the proximity sensor is stationary within the field. The one or more object identification signals are dependent upon whether an object is stationary in the field of the proximity sensor.

In an example method of any of the preceding example methods, the signaling includes determining whether an object in the field of the proximity sensor is moving within the field. The one or more object identification signals are dependent upon whether an object is moving within the field of the proximity sensor.

In an example method of any of the preceding example methods, the signaling includes determining whether the adjusted proximity signal satisfies a human correlation condition indicating human tissue with the field of the proximity sensor. The one or more object identification signals are dependent upon whether an object includes human tissue within the field of the proximity sensor.

In an example method of any of the preceding example methods, the signaling includes detecting motion of the electronic device, determining whether the detected motion increases probability that human tissue is within the field of the proximity sensor, and increasing confidence in detection of human tissue in the field of the proximity sensor. The one or more object identification signals being dependent upon whether human tissue is present in the field of the proximity sensor.

In an example method of any of the preceding example methods, wherein the signaling includes outputting an object detect signal and a human detect signal as the one or more object identification signals for identification of a type of object in the field of the proximity sensor of the electronic device.

Another example electronic device includes a proximity sensor, and ambient environmental conditions sensor, a proximity detection subsystem, and an RF transmitter. The proximity sensor generates a proximity signal dependent on one or more ambient environmental conditions on the proximity sensor and detection of an object in a proximity field of the proximity sensor. The ambient environmental conditions sensor is positioned in proximity of the proximity sensor and generates a reference signal. The reference signal is independent of an object in the proximity field of the ambient environmental conditions sensor. The proximity detection subsystem is communicatively coupled to the proximity sensor and to the ambient environmental conditions sensor. The proximity detection subsystem adjusts the proximity signal by filtering out effects of the one or more ambient environmental conditions from the proximity signal. The RF transmitter is communicatively coupled to the proximity sensor, the ambient environmental sensor, and the proximity detection subsystem. The RF transmitter adjusts transmission power based on the adjusted proximity signal.

In an example electronic device of any of the preceding example electronic devices, the one or more ambient environmental conditions include at least one of a temperature change or a humidity change.

In an example electronic device of any of the preceding example electronic devices, the proximity detection subsystem adjusts the proximity signal with a direct current offset. The direct current offset is based on the reference signal.

Another example device includes means for generating a proximity signal from a proximity sensor of an electronic device, means for adjusting the proximity signal, and means for signaling an RF transmitter. The proximity signal of the proximity sensor is dependent on one or more ambient environmental conditions of the proximity sensor and dependent on a presence of an object in a field of the proximity sensor. The means for adjusting the proximity signal filters out effects of the one or more ambient environmental conditions from the proximity signal based on a reference signal generated from an environmental conditions sensor positioned in proximity of an RF transmitter and the proximity sensor. The reference signal is independent of an object in the field of the proximity sensor. The means for signaling the RF transmitter with one or more object identification signals adjusts transmission power of the RF transmitter based on the adjusted proximity signal.

In an example device of any of the preceding example devices, the one or more ambient environmental conditions include at least one of a temperature change or a humidity change.

In an example device of any of the preceding example devices, the means for adjusting the proximity signal adjusts the proximity signal with a direct current offset. The direct current offset is based on the reference signal.

In an example device of any of the preceding example devices, the means for the signaling determines whether an object in the field of the proximity sensor is stationary within the field. The one or more object identification signals are dependent upon whether an object is stationary in the field of the proximity sensor.

In an example device of any of the preceding example devices, the means for the signaling determines whether an object in the field of the proximity sensor is moving within the field. The one or more object identification signals are dependent upon whether an object is moving within the field of the proximity sensor.

In an example device of any of the preceding example devices, the means for the signaling determines whether the adjusted proximity signal satisfies a human correlation condition indicating human tissue with the field of the proximity sensor. The one or more object identification signals are dependent upon whether an object includes human tissue within the field of the proximity sensor.

In an example device of any of the preceding example devices, the means for the signaling detects motion of the electronic device, determines whether the detected motion increases probability that human tissue is within the field of the proximity sensor, and increases confidence in detection of human tissue in the field of the proximity sensor. The one or more object identification signals are dependent upon whether human tissue is present in the field of the proximity sensor.

In an example device of any of the preceding example devices, the means for the signaling outputs an object detect signal and a human detect signal as the one or more object identification signals for identification of a type of object in the field of the proximity sensor of the device.

The described and contemplated implementation is a matter of choice, dependent on the performance requirements of the computer system implementing the invention. Furthermore, it should be understood that operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. An electronic device comprising:
   an RF transmitter;
   a proximity sensor that generates a proximity signal dependent on a capacitance measurement influenced by one or more ambient environmental conditions of the proximity sensor and dependent on proximity of an object in a proximity field of the proximity sensor;
   a proximity detection subsystem communicatively coupled to the proximity sensor and the RF transmitter, the proximity detection subsystem configured to:
   adjust the proximity signal by filtering out effects of the one or more ambient environmental conditions from the proximity signal;
   generate one or more object identification signals dependent upon whether or not the object includes human tissue within the proximity field of the proximity sensor; and
   signal the RF transmitter to adjust transmission power of the RF transmitter based on the adjusted proximity signal and the one or more object identification signals.

2. The electronic device of claim 1 further comprising an ambient environmental conditions sensor positioned in proximity of the RF transmitter and the proximity sensor and being communicatively coupled to the proximity detection subsystem, the ambient environmental conditions sensor generating a reference signal, the reference signal being independent of an object in the proximity field of the ambient environmental conditions sensor, the proximity detection subsystem adjusting the proximity signal based on the reference signal to filter out effects of the one or more ambient environmental conditions from the proximity sensor.

3. The electronic device of claim 2 wherein the one or more ambient environmental conditions include at least one of a temperature change or a humidity change.

4. The electronic device of claim 1 wherein the proximity detection subsystem adjusts the proximity signal with a direct current offset, the direct current offset being based on the reference signal.

5. The electronic device of claim 1 wherein the proximity detection subsystem determines whether an object in the proximity field of the proximity sensor is stationary within the proximity field, the one or more object identification signals being dependent upon whether an object is stationary in the proximity field of the proximity sensor.

6. The electronic device of claim 1 wherein the proximity detection subsystem determines whether an object in the proximity field of the proximity sensor is moving within the proximity field, the one or more object identification signals being dependent upon whether an object is moving within the proximity field of the proximity sensor.

7. The electronic device of claim 1 wherein the proximity detection subsystem generates the one or more object identification signals by determining whether the adjusted proximity signal satisfies a human correlation condition indicating human tissue with the proximity field of the proximity sensor.

8. The electronic device of claim 1 wherein the proximity detection subsystem detects motion of the electronic device, determines whether the detected motion increases probability that the proximity signal was generated based on human tissue within the proximity field of the proximity sensor, and increases confidence in detection of human tissue in the proximity field of the proximity sensor.

9. The electronic device of claim 1 wherein the proximity detection subsystem outputs an object detect signal and a human detect signal as the one or more object identification signals for identification of a type of object in the proximity field of the proximity sensor of the electronic device.

10. A method comprising:
    generating a proximity signal from a proximity sensor of an electronic device, the proximity signal of the proximity sensor being dependent on a capacitance measurement influenced by one or more ambient environmental conditions of the proximity sensor and dependent on a presence of an object in a field of the proximity sensor;
    adjusting the proximity signal by filtering out effects of the one or more ambient environmental conditions from the proximity signal based on a reference signal generated from an environmental conditions sensor positioned in proximity of an RF transmitter and the proximity sensor, the reference signal being independent of an object in the field of the proximity sensor; and
    signaling the RF transmitter with one or more object identification signals to adjust transmission power of the RF transmitter based on the adjusted proximity signal, the one or more object identification signals being dependent upon whether an object includes human tissue within the proximity field of the proximity sensor.

11. The method of claim 10 wherein the one or more ambient environmental conditions include at least one of a temperature change or a humidity change.

12. The method of claim 10 wherein the operation of adjusting the proximity signal comprises:
    adjusting the proximity signal with a direct current offset, the direct current offset being based on the reference signal.

13. The method of claim 10 wherein the signaling comprises:
    determining whether an object in the field of the proximity sensor is stationary within the field, the one or more object identification signals being dependent upon whether an object is stationary in the field of the proximity sensor.

14. The method of claim 10 wherein the signaling comprises:
   determining whether an object in the field of the proximity sensor is moving within the field, the one or more object identification signals being dependent upon whether an object is moving within the field of the proximity sensor.

15. The method of claim 10 wherein the signaling comprises:
   determining whether the adjusted proximity signal satisfies a human correlation condition indicating human tissue with the field of the proximity sensor.

16. The method of claim 10 wherein the signaling comprises:
   detecting motion of the electronic device;
   determining whether the detected motion increases probability that the proximity signal was generated based on human tissue within the field of the proximity sensor; and
   increasing confidence in detection of human tissue in the field of the proximity sensor, the one or more object identification signals being dependent upon whether human tissue is present in the field of the proximity sensor.

17. The method of claim 10 wherein the signaling comprises:
   outputting an object detect signal and a human detect signal as the one or more object identification signals for identification of a type of object in the field of the proximity sensor of the electronic device.

18. An electronic device comprising:
   a proximity sensor that generates a proximity signal, the proximity signal of the proximity sensor being dependent on a capacitance measurement influenced by one or more ambient environmental conditions on the proximity sensor and detection of an object in a proximity field of the proximity sensor;
   an ambient environmental conditions sensor positioned in proximity of the proximity sensor, the ambient environmental conditions sensor generating a reference signal, the reference signal being independent of an object in the proximity field of the ambient environmental conditions sensor;
   a proximity detection subsystem communicatively coupled to the proximity sensor and the ambient environmental conditions sensor, the proximity detection subsystem adjusting the proximity signal by filtering out effects of the one or more ambient environmental conditions from the proximity signal and generating one or more object identification signals dependent upon whether or not the object includes human tissue within the proximity field of the proximity sensor; and
   an RF transmitter communicatively coupled to the proximity sensor, the ambient environmental sensor, and the proximity detection subsystem, the RF transmitter adjusting transmission power based on the adjusted proximity signal and the one or more object identification signals.

19. The electronic device of claim 18 wherein the one or more ambient environmental conditions include at least one of a temperature change or a humidity change.

20. The electronic device of claim 18 wherein the proximity detection subsystem adjusts the proximity signal with a direct current offset, the direct current offset being based on the reference signal.

* * * * *